(12) United States Patent
Guo et al.

(10) Patent No.: US 10,666,094 B2
(45) Date of Patent: May 26, 2020

(54) WIRELESS POWER TRANSMISSION SYSTEM, POWER TRANSMITTING TERMINAL, POWER RECEIVING TERMINAL AND DETECTION METHOD

(71) Applicant: NINGBO WEIE ELECTRONICS TECHNOLOGY LTD., Ningbo, Zhejiang (CN)

(72) Inventors: Desheng Guo, Ningbo (CN); Lizhi Xu, Ningbo (CN); Weiyi Feng, Ningbo (CN); Feng Yu, Ningbo (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 86 days.

(21) Appl. No.: 16/055,946

(22) Filed: Aug. 6, 2018

(65) Prior Publication Data
US 2019/0052127 A1 Feb. 14, 2019

(30) Foreign Application Priority Data
Aug. 11, 2017 (CN) .......................... 2017 1 0687775

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .................................. H02J 50/60; H02J 50/12
See application file for complete search history.

(56) References Cited

FOREIGN PATENT DOCUMENTS

| CN | 106910953 | 6/2017 |
|---|---|---|
| CN | 107947396 | 4/2018 |
| CN | 108109831 | 6/2018 |

*Primary Examiner* — Robert L Deberadinis
(74) *Attorney, Agent, or Firm* — Andrus Intellectual Property Law, LLP

(57) ABSTRACT

The present disclosure discloses a wireless power transmission system, a wireless power transmitting terminal, a wireless power receiving terminal and a detection method, wherein the wireless power transmission system comprises a wireless power transmitting terminal and a wireless power receiving terminal. The wireless power transmitting terminal intermittently transmits power to the wireless power receiving terminal in a wireless way and the transmitting power of the wireless power transmitting terminal is detected during different time periods. The wireless power receiving terminal is used to wirelessly receive power and supply power to an actual load. The detection method is used to detect the number of coupled wireless power receiving terminals at the wireless power transmitting terminal. The present disclosure detects the number of the wireless power receiving terminals by dividing a difference between the transmitting power of the wireless power transmitting terminal when the wireless power receiving terminals output power only to detection loads and the transmitting power of the wireless power transmitting terminal when the wireless power receiving terminals output no power by specific power of the detection load.

16 Claims, 5 Drawing Sheets

WIRELESS POWER TRANSMISSION SYSTEM, POWER TRANSMITTING TERMINAL, POWER RECEIVING TERMINAL AND DETECTION METHOD

CROSS REFERENCE TO RELATED APPLICATION

The present application claims the priority of the Chinese application No. 201710687775.4 with the title of "Wireless Power Transmission System, Power Transmitting Terminal, Power Receiving Terminal And Detection Method" filed on Aug. 11, 2017, the entire contents of which are incorporated herein by reference.

TECHNICAL FIELD

The present disclosure relates to the field of wireless power transmission, and more particularly, to a wireless power transmission system, a wireless power transmitting terminal, a wireless power receiving terminal and a detection method.

BACKGROUND

Wireless power supply technology can wirelessly transmit power between electronic devices and is therefore widely used in consumer electronics and other types of electronic products. Current mainstream technology uses electromagnetic induction or magnetic resonance for energy transmission. It contains an energy transmitting terminal and several energy receiving terminals. The transmitting terminal converts the power into an alternating electromagnetic field to propagate in free space. When a receiving terminal is placed in the alternating electromagnetic field, it will generate the power by sensing the alternating electromagnetic field, thus enabling the energy to be transmitted in the free space. The wireless power supply technology eliminates the need for connection conductive wires between power consumption equipment and power supply device and power supply interface on the power consumption equipment, which can make the power supply safer, more reliable, and tidy. It has been widely used in electric tools, smart watches, smart bracelets and other electronic devices.

At present, the Airfuel Alliance adopts a separate Bluetooth device to achieve a two-way communication between wireless power transmitting terminal and wireless power receiving terminal. This allows one transmitting terminal to communicate with N receiving terminal simultaneously, and thus obtains the number and charging state of the wireless power receiving terminals. However, it requires adding Bluetooth devices at both transmitting side and receiving side, which will significantly increase the cost of the hardware.

SUMMARY

In view of this, the present disclosure discloses a wireless power transmission system, a wireless power transmitting terminal, a wireless power receiving terminal and a detection method, so as to achieve the aim of information transmission between the wireless power transmitting terminal and the wireless power receiving terminal and detecting the number of the wireless power receiving terminals by using a simple method with a lower hardware cost.

In the first aspect of the present disclosure, a wireless power transmission system is provided which comprises:

a wireless power transmitting terminal adapted to wirelessly transmitting power; and at least one wireless power receiving terminal adapted to wirelessly receive power;

wherein the wireless power receiving terminals are configured to be synchronized with each other to output no power during a first time period and output power to predetermined detection loads during a second time period, and the wireless power transmitting terminal is configured to detect the number of coupled wireless power receiving terminals according to transmitting power detected during the first time period and transmitting power detected during the second time period.

Further, a wireless power transmitting terminal is provided which comprises:

a power transmitting circuit;

a power detection circuit configure to detect power input to the power transmitting circuit; and a first controller configured to detect the number of coupled wireless power receiving terminals according to the transmitting power detected during the first time period and the transmitting power detected during the second time period.

Further, the wireless power transmitting terminal is configured to calculate the number of the wireless power receiving terminals by dividing a difference between the transmitting power detected during the second time period and the transmitting power detected during the first time period by specific power of the detection load.

Further, a wireless power receiving terminal is provided which comprises:

a power receiving circuit configured to receive power;

a detection load and a detection switch connected in series at an output port of the power receiving circuit;

a control switch provided between the output port of the power receiving circuit and an output port of the wireless power receiving terminal; and a second controller configured to control the detection switch and the control switch to maintain off during a first time period and control the detection switch to turn on and the control switch to maintain off during a second time period.

Further, the second controller is configured to control the detection switch to turn off and the control switch to turn on during a third time period, and the first controller is configured to detect whether the wireless power receiving terminals are connected to the loads and supply power to the loads according to the transmitting power of the wireless transmitting terminal detected during the first time period and the transmitting power of the wireless transmitting terminal detected during the third time period.

Further, the wireless power receiving terminal is configured to perform fault detection during a fourth time period.

Further, the first controller is configured to control the power transmitting circuit to operate intermittently, and the second controller performs timing according to a power-on time of the power receiving circuit to synchronize with the wireless power transmitting terminal.

Further, the first controller is configured to detect whether there is foreign matter according to the transmitting power detected during the first time period.

According to a second aspect of the present disclosure, a detection method is provided for detecting the number of coupled wireless power receiving terminals at a wireless power transmitting terminal is provided, the detection method comprising:

controlling all the wireless power receiving terminals to be synchronized with each other to output no power and detecting transmitting power of the wireless power transmitting terminal during a first time period;

controlling all the wireless power receiving terminals to be synchronized with each other to output power to predetermined detection loads and detecting the transmitting power of the wireless power transmitting terminal during a second time period; and detecting the number of the wireless power receiving terminals according to the transmitting power of the wireless power transmitting terminal during the first time period and the transmitting power of the wireless power transmitting terminal during the second time period.

Further, the method comprises calculating the number of the wireless power receiving terminals by dividing a difference between the transmitting power during the second time period and the transmitting power during the first time period by specific power of the detection load.

Further, the method comprises controlling all the wireless power receiving terminals to be synchronized with each other to output no power to the detection loads and output power to actual loads and detecting the transmitting power of the wireless power transmitting during a third time period; and detecting whether the coupled wireless power receiving terminals are connected to the actual loads and supply power to the actual loads according to the transmitting power of the wireless power transmitting terminal detected during the first time period and the transmitting power of the wireless power transmitting terminal detected during the third time period.

Further, the method comprises controlling the wireless power receiving terminal to perform fault detection during a fourth time period.

Further, the method comprises controlling the wireless power transmitting terminal to operate intermittently, and the wireless power receiving terminal performing timing according to a power-on time thereof to synchronize with the wireless power transmitting terminal.

Further, the method comprises detecting whether there is foreign matter according to the transmitting power of the wireless power transmitting terminal detected during the first time period.

In the wireless power transmission system of the embodiment of the present disclosure, by detecting the transmitting power of the wireless power transmitting terminal during different time periods by a power detection circuit in real time, the wireless power receiving terminal is correspondingly in different states during the different time periods and thus the number and charging state of the wireless power receiving terminals can be detected in real time. The technical solution of the present disclosure excellently solves the problem of causing a relative high hardware cost by using a Bluetooth device and is simple and convenient.

DETAILED DISCLOSURE

Hereinafter, the present disclosure will be described based on the embodiments. However, the present invention is not limited to these embodiments. In the detailed description of the present disclosure hereinafter, some specific details will be described exhaustively. For those skilled in the art, the present invention may be thoroughly understood without description of these details. In order to avoid confusing the substance of the present invention, known methods, processes, flows, elements and circuits will not be described in detail.

In addition, the skilled in the art should understand the drawings provided here are for illustrative purposes, and the drawings are not necessarily drawn in proportion.

Meanwhile, it should be understood that in the following description, the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection between two components can be physical or logical connection, or physical and logical connection. On the contrary, when one component is referred to as being "coupled directly to" or "connected directly to" another component, it means that there is no intermediate component between two components.

Unless explicitly required in the context, the terms "comprise" and "comprise" and like expressions in the entire description and claims should be interpreted as an inclusive meaning, not an exclusive or exhaustive meaning; in other words, they mean "comprise, but not limited to."

In the description of the present disclosure, it should be understood that the terms "first" and "second" and the like are only for descriptive purposes, and cannot be understood as indicating or implying relative importance. In addition, in the description of the present invention, unless otherwise indicated, the meaning of "plural" is two or above.

Figure 1:
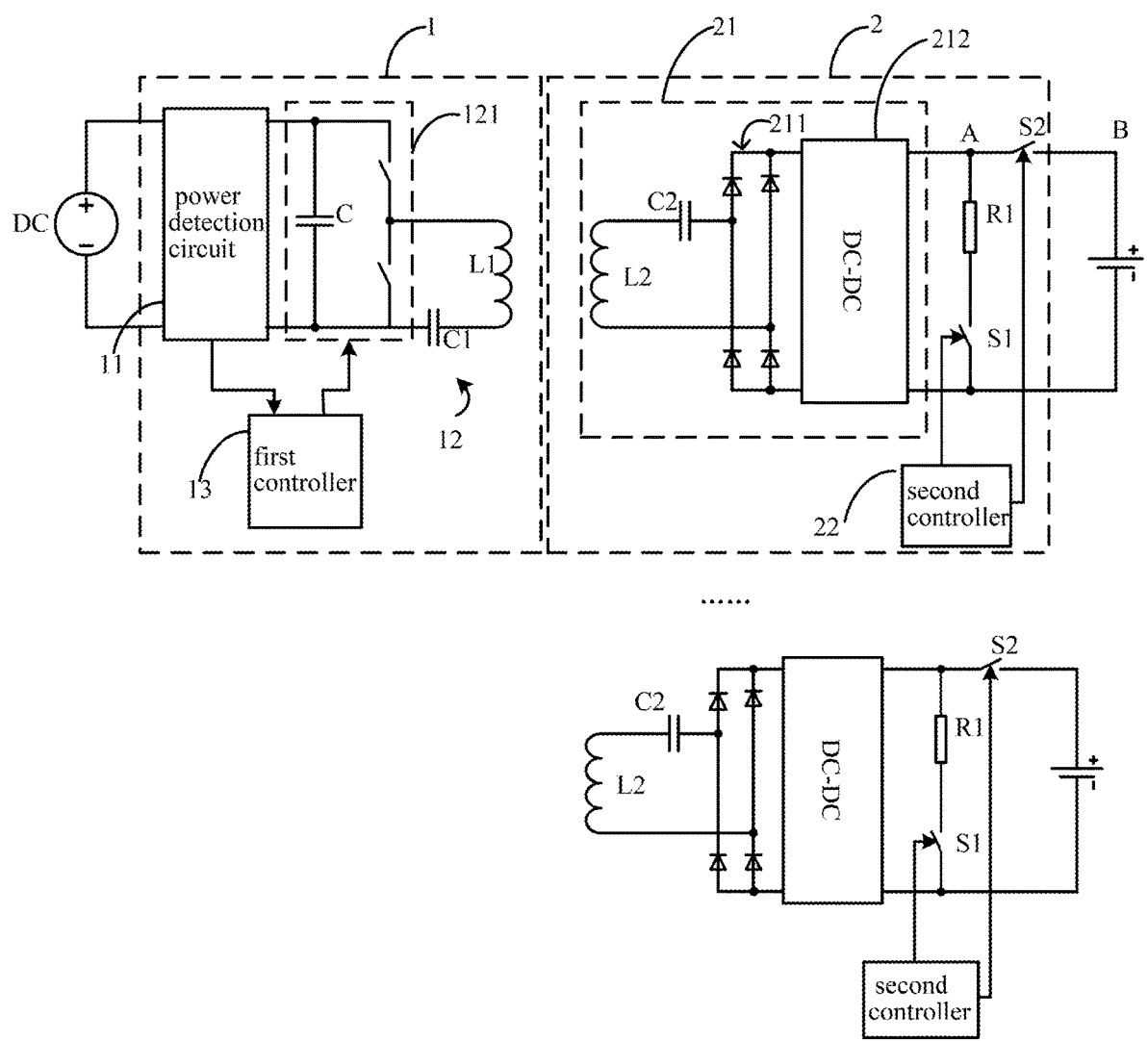
FIG. 1 is a schematic diagram of a wireless power transmission system according to an embodiment of the present disclosure.
Figure 2:
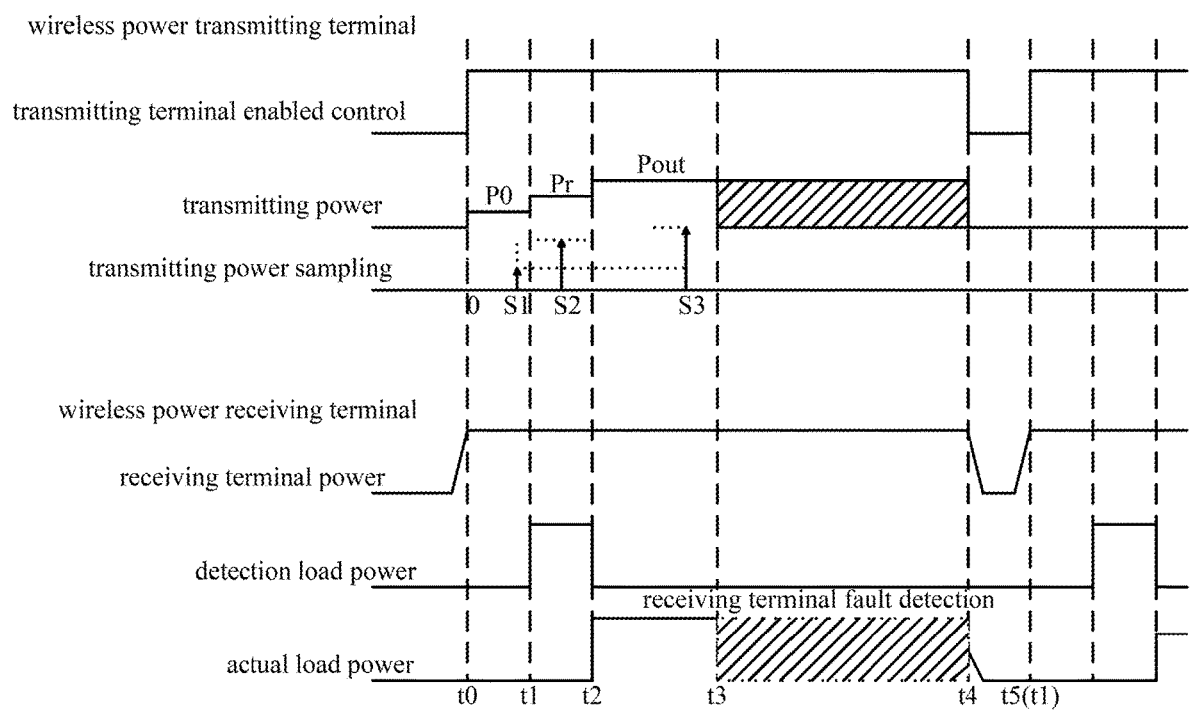
FIG. 2 is a timing diagram of a wireless power transmission system according to an embodiment of the present disclosure.

FIG. 1 is a schematic diagram of a wireless power transmission system according to an embodiment of the present disclosure. FIG. 2 is a timing diagram of a wireless power transmission system according to an embodiment of the present disclosure. As shown in FIG. 1 and FIG. 2, the wireless power transmission system comprises a wireless power transmitting terminal 1 and at least one wireless power receiving terminal 2. The wireless power transmitting 1 is adapted to wirelessly output power, and the wireless power receiving terminal 2 is adapted to wirelessly receive power and supply power to an actual load. In the present embodiment, the wireless power receiving terminals 2 are configured to be synchronized with each other to output no power during a first time period (time t0 to time t1) and output power to detection loads R1 during a second time period (time t1 to time t2). Thus, during the first time period, none of the wireless power receiving terminals 2 outputs power, which enables the wireless power transmitting terminal 1 to which they are coupled to maintain only a lowest operating power. During the second time period, since all the wireless power receiving terminals 2 output power to the detection loads R1, the power consumption of all the wireless power receiving terminals 2 are identical. During the second time period, the transmitting power of the wireless power transmitting terminal 1 is the lowest operating power plus the power output to the detection loads R1 by all the wireless power receiving terminals 2. Based on this, the number of the wireless power receiving terminals 2 can be calculated.

Therefore, the wireless power transmitting terminal 1 can be configured to detect the number of coupled wireless power receiving terminals 2 according to the transmitting power detected during the first time period and the transmitting power detected during the second time period.

As described above, during the second time period, the transmitting power of the wireless power transmitting terminal 1 is the lowest operating power plus the powers output to the detection loads R1 by all the wireless power receiving terminals 2. When the detection loads R1 of all the wireless power receiving terminals 2 are identical, an output power of each of the wireless power receiving terminals 2 is also identical. Thus, the wireless power transmitting terminal 1 can calculate the number of the wireless power receiving terminals by dividing a difference between the transmitting power detected during the second time period and the transmitting power detected during the first time period by specific power of the detection load R1.

Further, all the wireless power receiving terminals 2 only output power to actual loads during a third time period (time t2 to time t3). During this time, the transmitting power of the wireless power transmitter 1 is the lowest operating power plus the power output to the actual loads by all the wireless power receiving terminals 2. Based on this, it can be determined whether the wireless power receiving terminals 2 supply power to the actual load.

Further, all the wireless power receiving terminals 2 perform fault detection during a fourth time period (time t3 to time t4). If there is a fault, the wireless power transmitting terminal 1 is controlled to stop transmitting power and the wireless power receiving terminals are controlled to stop outputting and it is prompted that there is a fault. If there is no fault, the wireless power transmitting 1 stops transmitting power at time t4 and all the wireless power receiving terminals 2 reset. The wireless power transmitting terminal 1 starts transmitting power at time t5 and a new cycle starts.

Further, foreign matter invasion protection is performed during the first time period. If the transmitting power of the wireless power transmitting terminal 1 detected during the first time period is greater than the known normal lowest operating power of the wireless power transmitting terminal 1, it is considered that there is foreign matter around the wireless power transmission system, the power output of the wireless power transmitting terminal should be stopped in time and there is a remainder for the foreign matter invasion.

In addition, by making the wireless power transmitting terminal 1 operate intermittently, the synchronization of all the wireless power receiving terminals 2 with the wireless power transmitting terminal 1 to which they are coupled can be realized. Specifically, the wireless power transmitting terminal 1 stops transmitting power at time t4 and restarts transmitting power at time t5. The wireless power receiving terminals 2 are turned off at time t4 due to sensing no power and restart at time t5 after sensing a alternating electromagnetic field. Thus, all the wireless power receiving terminals 2 in charging area that can be coupled to the same wireless power transmitting terminal 1 are simultaneously activated according to the cycle of the wireless power transmitting terminal. By setting a timer that starts timing after the activation of the wireless power receiving terminal 2, it is possible to realize a synchronous action of all the wireless power receiving terminals 2. According to a test, a synchronization error achieved in this way is within 1 ms.

The wireless power transmission system obtains the number and charging states of the wireless power receiving terminals 2 by the transmitting power of the wireless power transmitting terminal 1 during each of different time periods. When the wireless power receiving terminals are unloaded, the transmitting power of the wireless power transmitting terminal 1 is detected as P0. The specific power consumed by the detection load is detected as PR. The transmitting of the wireless power transmitting terminal 1 is detected as Pr when the wireless power receiving terminals only output power to the detection loads. The transmitting of the wireless power transmitting terminal 1 is detected as Pout when the wireless power receiving terminals only output power to the actual loads.

The number and charging states of wireless power receiving terminals 2 may be calculated according to the transmitting power of the wireless power transmitting terminal 1 during different time periods as stated above. The number N of the wireless power receiving terminals 2 is calculated as N=(Pr−P0)/PR. It can be determined whether the wireless power receiving terminals 2 supply power to the actual loads by comparing the size of P0 and Pout.

In an alternative implementation, as shown in FIG. 1, the wireless power transmitting terminal 1 comprises a power detecting circuit 11, a power transmitting circuit 12 and a first controller 13. The power detection circuit 11 is used to detect the transmitting power of the wireless power transmitting terminal 1 in real time. The power transmitting circuit 12 is used to convert the power into electromagnetic wave to transmit in free space.

The first controller 13 is configured to acquire the transmitting power of the wireless power transmitting terminal 1 during each time period from the power detecting circuit 11 and control the operation of the wireless power transmitting terminal 1. The first controller 13 may detect the number of the coupled wireless power receiving terminals 2 according to the transmitting power detected during the first time period and the transmitting power detected during the second time period. The first controller 13 can also, during the first time period, determine whether there is foreign matter invasion according to the transmitting power of the wireless power transmitting terminal 1 during this time period, and control the wireless power transmitting terminal 1 to keep operating or stop operating according to the detection result. The first controller 13 can, during the third time period, determine whether the wireless power receiving terminals 2 coupled to the wireless power transmitting terminal 1 supply power to the actual loads, that is, whether there is an output, according to the transmitting power of the wireless power transmitting terminal 1 during this time period.

The first controller 13 may be implemented by a programmable device such as a microcontroller unit (MCU), a programmable logic controller (PLC), a field programmable gate array (FPGA) and may also be implemented by an application-specific integrated circuit.

The power transmitting circuit 12 comprises an inverter circuit 121, a transmitting coil L1 and a capacitance C1. The inverter circuit 121 is used to convert a direct current to a high-frequency alternating current to deliver to the transmitting coil L1. The transmitting coil L1 and the capacitance C1 form a resonant circuit that resonates under the drive of the high-frequency alternating current so as to form an alternating electromagnetic field.

It should be understood that the inverter circuit 121 in the embodiment of the present disclosure adopts a half-bridge inverter circuit, but the embodiment is not limited thereto, and the inverter circuit 121 can be realized by an inverter circuit with an equivalent function such as a single-ended inverter circuit, a full-bridge inverter circuit and a push-pull bridge inverter circuit.

In an alternative implementation manner, as shown in FIG. 1, the wireless energy receiving terminal 2 comprises a power receiving circuit 21, a second controller 22, a detection load R1, a detection switch S1 and a control switch S2. The power receiving circuit 21 wirelessly receives power. The second controller 22 is used to control the detection switch S1 and the control switch S2.

Corresponding to the power transmitting circuit 12, the power receiving circuit 21 comprises a receiving coil L2, a capacitance C2, a rectifying circuit 211 and a DC-DC converter circuit (direct current-direct current converter circuit) 212. The coil L2 and the capacitance C2 resonate at an operating frequency so that the alternating electromagnetic field generates a high-frequency alternating current. The rectifying circuit 211 converts the high-frequency alternating current to a direct current that can be supplied to the load. The DC-DC converter circuit 212 converts a DC voltage to an output voltage that can drive the actual load to operate.

It should be understood that the rectifying circuit used in the embodiment of the present disclosure is a full-bridge rectifying circuit, but the embodiment of the present disclosure is not limited thereto, and such function can be achieved by a rectifying circuit with an equivalent function such as a half-wave rectifying circuit, a full-wave rectifying circuit and a half-bridge rectifying circuit.

The DC-DC conversion circuit 212 is preferably a switch-type converter that converts the input DC voltage into a desired output voltage by controlling the switch to turn on and turn off. The switch type converter can use various topologies such as a buck topology, a boost topology, a flyback topology.

Figure 4:
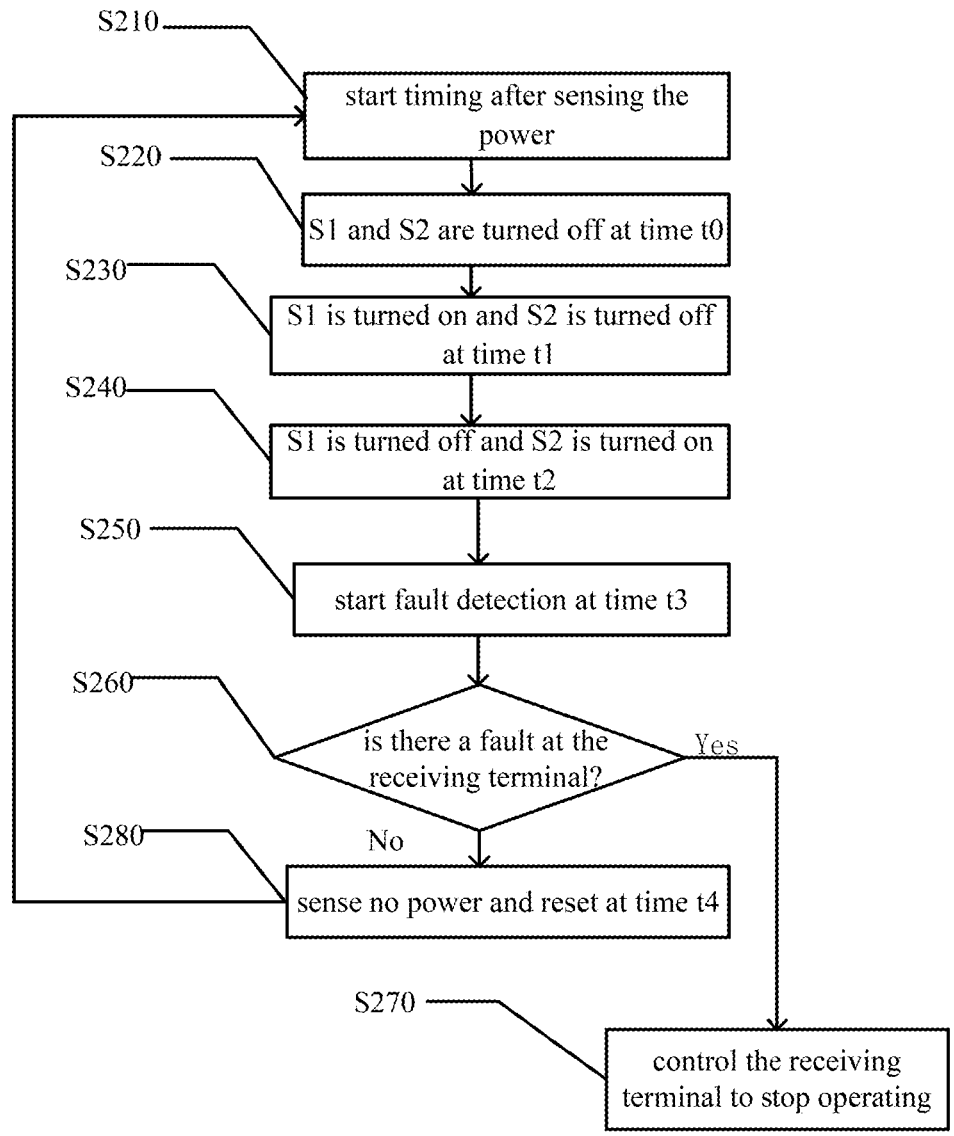
FIG. 4 is a working flowchart of a wireless power receiving terminal according to an embodiment of the present disclosure.

The detection load R1 and the detection switch S1 are connected in series at an output port of the DC-DC conversion circuit 212. The control switch S2 is provided between nodes A and B, as shown in FIG. 4. When the detection switch S1 is turned on and the control switch S2 is turned off, the detection load R1 is connected to the output port of the DC-DC conversion circuit 212 so that the power reception circuit 21 can output power to the detection load R1. When the control switch S2 is turned on and the detection switch S1 is turned off, the actual load is connected to the output port of the DC-DC conversion circuit 212 so that the power reception circuit 21 can output power to the actual load.

Thus, by controlling the detection switch S1 and the control switch S2 with the second controller 22, the switching between three states, i.e., the wireless power receiving terminal 2 only outputs power to the detection load R1 (the detection switch S1 is turned on and control switch S2 is turned off), the wireless power receiving terminal 2 only outputs power to the actual load (the detection switch S1 is turned on and control switch S2 is turned off) and the wireless power receiving terminal 2 outputs no power.

It should be understood that the second controller 22 may be implemented by a programmable device such as a microcontroller unit (MCU), a programmable logic controller (PLC), a field programmable gate array (FPGA) and may also be implemented by an application-specific integrated circuit.

Figure 3:
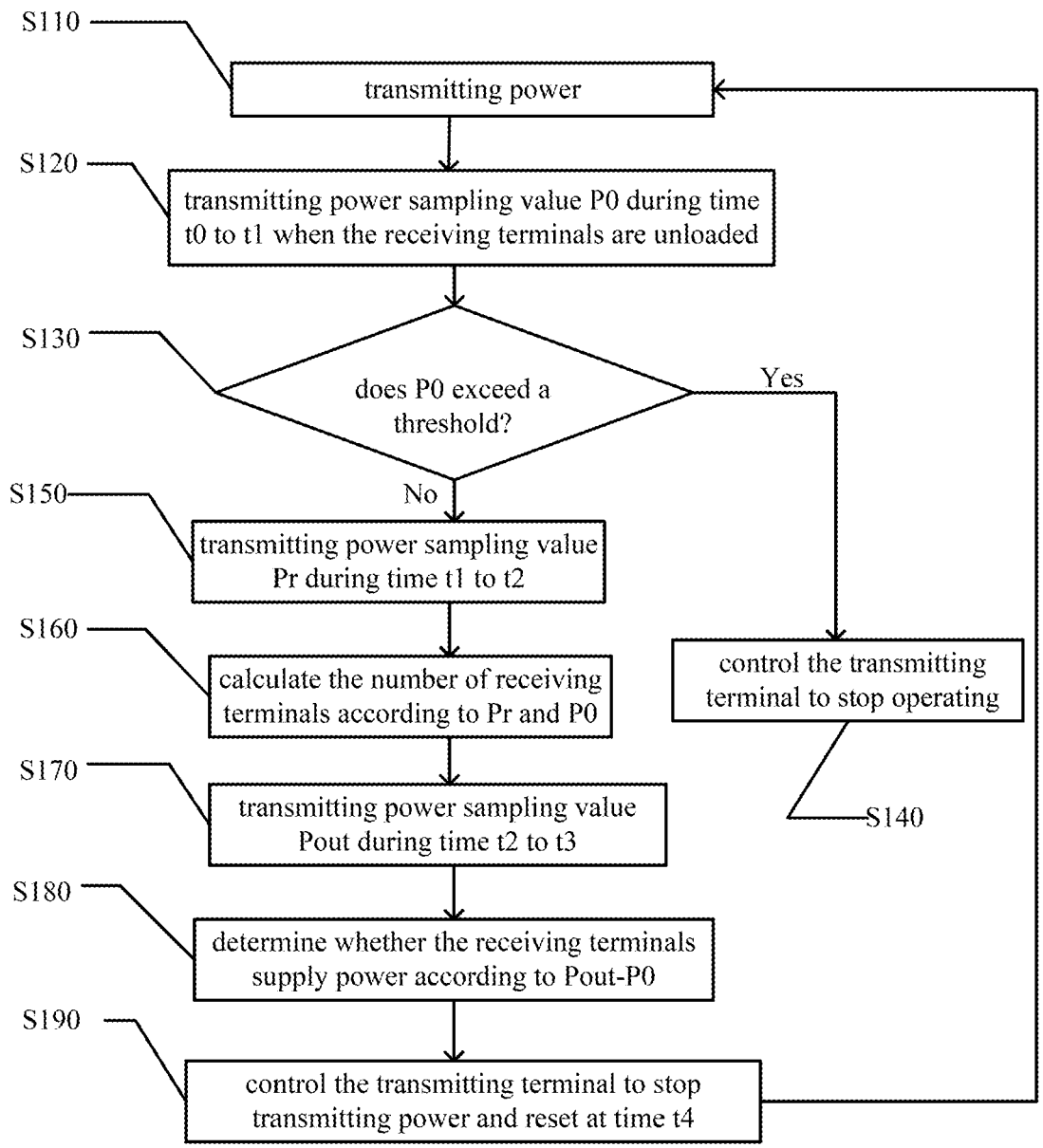
FIG. 3 is a working flowchart of a wireless power transmitting terminal according to an embodiment of the present disclosure.

FIG. 3 is a working flowchart of a wireless power transmitting terminal according to an embodiment of the present disclosure and FIG. 4 is a working flowchart of a wireless power receiving terminal according to an embodiment of the present disclosure. The workflows of the first controller and the second controller in the embodiments of the present disclosure are described below with reference to FIG. 3 and FIG. 4.

For the first controller 13, the workflow thereof is as follows:

At step S110, the power transmitting circuit is controlled to start working to transmit power to the outside at time t0.

At step S120, the power detection circuit 11 is controlled to sample and record the transmitting power of the wireless power transmitting terminal 1 at a selected certain time point S1 during time t0 to time t1 (the first time period).

Since all the wireless power receiving terminals 2 are synchronized with each other to be in a state of outputting no power to the outside during time t0 to time t1, the obtained transmitting power P0 shall be the lowest operating power under normal circumstances.

It should be understood that it may also detect the transmitting power continuously or discretely during the entire time period or during a part of the time period, average the detected transmitting power, and use the average value as the transmitting power of the wireless power transmitting terminal detected during the time period.

At step S130, after acquiring the transmitting power P0, it is determined whether P0 is greater than the lowest operating power of the wireless power transmitting terminal 1 under normal operation to determine whether there is a foreign matter invasion. If there is a foreign matter invasion, the process proceeds to step S140. If there is no foreign object invasion, the process proceeds to step S150.

Specifically, the wireless power transmission system needs to prevent foreign matter with a relatively high electrical conductivity or magnetic permeability from entering charging area. When such foreign matter enters the charging area, the alternating electromagnetic field will create a current loop on the foreign matter, thereby generating unnecessary power consumption that can be recognized by detecting the transmitting power. It is indicated that there is foreign matter in the wireless power transmission system if the first controller 13 determines that the transmitting power P0 obtained by sampling during time t0 to time t1 is greater than the lowest operating power of the wireless power transmission system under normal operation.

It should be understood that the step S130 of detecting whether there is a foreign matter invasion in the wireless energy transmission system is not required, and this step may also be omitted when such detection function is not needed.

The time of executing step S130 is also between time t0 to time t1.

At step S140, a foreign matter invasion protection is performed. The wireless power transmitting terminal 1 is controlled to stop transmitting power and a reminder of a foreign matter invasion is given.

At step S150, the power detection circuit 11 is controlled to sample and record the transmitting power of the wireless power transmitting terminal 1 at a selected certain time point S2 during time t1 to time t2 (the second time period).

Since all the wireless power receiving terminals 2 are synchronized with each other to be in a state of outputting power only to the detection loads R1 during time t1 to time t2, the obtained transmitting power Pr is detected as the lowest operating power P0 of the wireless power transmitting terminal 1 plus the power consumed by the detection loads R1.

At step S160, the number N of the wireless power receiving terminals 2 is obtained by the transmitting power P0 and Pr recorded by controlling the power detecting circuit 11 and the pre-stored specific power PR of the detection load according to the following formula:

$$N=(Pr-P0)/PR$$

At step S170, the power detection circuit 11 is controlled to sample and record the transmitting power of the wireless power transmitting terminal 1 at a selected certain time point S3 during time t2 to time t3 (the third time period).

Since all the wireless power receiving terminals 2 are synchronized with each other to be in a state of outputting power only to the actual loads R1 during time t2 to time t3, the obtained transmitting power Pout is detected as the lowest operating power P0 of the wireless power transmitting terminal 1 plus the power consumed by the actual loads.

At step S180, the charging state of the wireless power receiving terminal 2 can be obtained by comparing the size of Pout and P0.

At step S190, the wireless power transmitter 1 stops transmitting power at time t4. At time t5, a new cycle starts and the process proceeds to step S110.

Correspondingly, for the second controller 22, the workflow thereof is as follows:

At step 210, a built-in timer is controlled to start timing after the wireless power receiving terminal 2 sensing the power at time t0.

At step 220, the detection switch S1 and the control switch S2 are controlled to maintain off during time t0 to time t1 (the first time period) so that the wireless power receiving terminal 2 does not output power.

At step 230, the control detection switch S1 is controlled to maintain on and the control switch S2 is controlled to maintain off during time t1 to time t2 (the second time period) so that the wireless power receiving 2 output power only to the detection load R1.

At step 240, the control detection switch S1 is controlled to maintain off and the control switch S2 is controlled to maintain on during time t2 to time t3 (the third time period) so that the wireless power receiving 2 output only power to the actual load.

At step 250, the wireless power transmitting terminal 1 continues to supply power and the second controller 22 controls the wireless power receiving terminal 2 to perform fault detection during time t3 to time t4 (the fourth time period).

At step 260, the second controller 22 performs fault diagnosis. If an abnormality is found, a fault protection is performed and the process proceeds to step 270. If there is no fault, the process proceeds to step 280.

It should be understood that the step S260 of detecting whether there is a fault in the wireless power receiving terminal is not required, and this step may also be omitted when such detection function is not needed.

The time of executing step S260 is also between time t3 and time t4.

At step 270, the fault protection is performed. The wireless power receiving terminal 2 is controlled to stop outputting power and a corresponding fault reminder is given.

At step 280, the wireless power receiving terminal 2 is reset at time t4 due to sensing no power. A new cycle starts at time t5 and the process proceeds to step S210.

As stated above, since the transmitting power P0 and Pr during different operating periods can be obtained by sampling the transmitting power of the wireless power transmitting terminal 1 during the first time period and the second time period by the power detection circuit 11, the specific power PR of the detection load is known and the types of the detection loads of all the wireless power receiving terminals 2 are identical, i.e., PR is identical, the number of the wireless power receiving terminals 2 can be obtained through the relationship between P0, PR and Pr.

By making the wireless power transmitting terminal 1 operate intermittently, the synchronization of the wireless power receiving terminals 2 can be realized. Specifically, the wireless power transmitting terminal 1 stops transmitting power from time t4 until time 5 when a cycle ends. During this time period, the wireless power receiving terminals 2 turn off due to sensing no power and restarts at time t5 after sensing the alternating electromagnetic field. Thus, all the wireless power receiving terminals 2 in the charging area that can be coupled to the same wireless power transmitting terminal 1 are simultaneously activated according to the cycle of the wireless power transmitting terminal 1. By setting a timer that starts timing after the activation of the wireless power receiving terminal 2, it is possible to realize a synchronous action of all the wireless power receiving terminals 2. According to a test, a synchronization error achieved in this way is within 1 ms.

If one or more wireless power receiving terminals 2 are added in a charging cycle, the added wireless power receiving terminal 2 cannot be synchronized with the wireless power transmitting terminal 1 in this cycle, and the shown number of the wireless power receiving terminals 2 calculated by the first controller 13 is also temporarily inaccurate. However, since the wireless power transmitting terminal 1 operates intermittently, after the end of this cycle, the wireless power transmitting terminal 1 stops transmitting power and all the wireless power receiving terminals 2 are reset at this time. From the beginning of the next cycle, all the wireless power receiving terminals 2 restarts timing when the wireless power transmitting terminal 1 restarts transmitting the power, and the wireless power receiving terminals 2 are synchronized with the wireless power transmitting terminal 1 at this time. Since one cycle is very short, the wireless power receiving terminal 2 and the wireless power transmitting terminal 1 can be quickly synchronized with each other. After a number of cycles, the number of the wireless power receiving terminals 2 obtained by detection is accurate.

Although the state of the wireless power receiving terminal is controlled by the detection switch S1 and the control switch S2 in FIG. 1, those skilled in the art can also adopt other ways to achieve the switching of the state of the wireless power receiving terminal. For example, the state of the DC-DC converter can be controlled to control whether the wireless power receiving terminal outputs power to the outside.

In the present embodiment, by detecting the transmitting power of the wireless power transmitting terminal 1 during different time periods by the power detection circuit 11 in real time, the wireless power receiving terminal 2 is correspondingly in different states during the different time periods and thus the number and charging state of the wireless power receiving terminals 2 can be detected in real time. The technical solution of the present disclosure excellently solves the problem of causing a relative high hardware cost by using a Bluetooth device and is simple and convenient.

Figure 5:
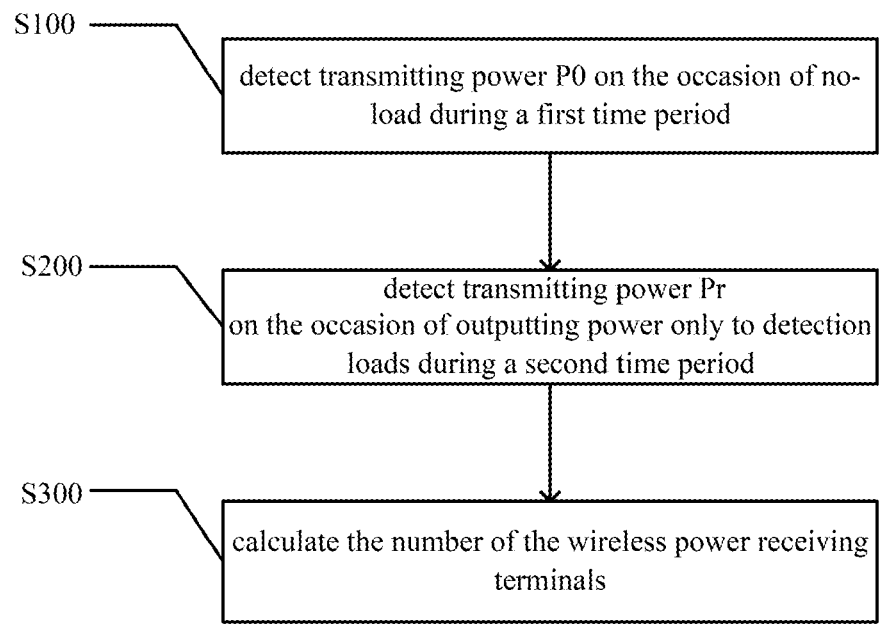
FIG. 5 is a flowchart of a detection method according to an embodiment of the present disclosure.

FIG. 5 is a flowchart of a detection method according to an embodiment of the present disclosure. As shown in FIG. 5, the detection method comprises:

Step S100: all the wireless power receiving terminals 2 are controlled to be synchronized with each other to output no power and the transmitting power of the wireless power transmitting terminal 1 is detected during a first time period (time t0 to time t1).

Step S200, all the wireless power receiving terminals 2 are controlled to be synchronized with each other to output power to predetermined detection loads R1 and the transmitting power of the wireless power transmitting terminal 1 is detected during a second time period (time t1 to time t2).

Step S300, the number of the wireless power receiving terminals 2 is detected according to the transmitting power of the wireless power transmitting terminal during the first time period and the transmitting power of the wireless power transmitting terminal during the second time period.

By detecting the transmitting power of the wireless power transmitting terminal 1 during different time periods by the power detection circuit 11 in real time, the wireless power receiving terminal is correspondingly in different states during the different time periods and thus the number and charging state of the wireless power receiving terminals can be detected in real time. The technical solution of the present disclosure excellently solves the problem of causing a relative high hardware cost by using a Bluetooth device and is relatively simple and convenient.

Further, step S300 comprises:

calculating the number of the wireless power receiving terminals 2 by dividing a difference between the transmitting power during the first time period and the transmitting power during the second time period by the specific power of the detection load R1.

In one embodiment, the detection method further comprises:

detecting whether there is a foreign matter according to the transmitting power of the wireless power transmitting terminal detected during the first time period. If there is a foreign matter invasion, controlling the wireless power transmitting terminal 1 and the wireless power receiving terminal 2 to stop operating and prompting that there is a foreign matter invasion, controlling all the wireless power receiving terminals 2 to output no power to the detection loads R1 and output power to the actual loads and detecting the transmitting power of the wireless power transmitting terminal 1 during the third time period (time t2 to time t3), detecting whether the coupled wireless power receiving terminals 2 supply power to the actual loads according to the transmitting power of the wireless power transmitting terminal 1 detected during the first time period and the transmitting power of the wireless power transmitting terminal 1 detected during the third time period, controlling the wireless power receiving terminal 2 to perform fault detection during the fourth time period (time t3 to time t4). If there is a fault, controlling the wireless power transmitting terminal 1 and the wireless power receiving terminal 2 to stop operating and prompting that there is a fault, and controlling the wireless power transmitting terminal 1 to operate intermittently, and the wireless power receiving terminal 2 perform timing according to the power-on time thereof so as to synchronize with the wireless power transmitting terminal 1.

The above description is a description of the embodiments of the present disclosure. Various changes and modifications may be made without departing from the scope of the present disclosure. The present disclosure is presented for illustrative purposes and should not be interpreted as an exclusive description of all embodiments of the present disclosure or as limiting the scope of the present disclosure to the specific elements illustrated and described in conjunction with these embodiments. Any one or more of the individual elements of the described disclosure may be replaced by a replacement element that provides substantially similar functionality or otherwise provides a sufficient operation without any limitation. This comprises currently known replacement elements, such as those currently known to those skilled in the art, as well as the replacement elements that may be developed in the future, such as those that the skilled in in the art might recognize as an alternative at the time of development.

The invention claimed is:

1. A wireless power transmission system comprising:
a wireless power transmitting terminal adapted to wirelessly transmitting power, wherein the wireless power transmitting terminal comprises a first controller; and
at least one wireless power receiving terminal adapted to wirelessly receive power, wherein each of the wireless power receiving terminals comprises a second controller;
wherein the wireless power receiving terminals are configured to be synchronized with each other to output no power during a first time period and output power to predetermined detection loads during a second time period, and the wireless power transmitting terminal is configured to detect the number of coupled wireless power receiving terminals according to transmitting power detected during the first time period and transmitting power detected during the second time period.

2. The wireless power transmission system of claim 1, wherein the wireless power transmitting terminal comprises:
a power transmitting circuit;
a power detection circuit configured to detect power input to the power transmitting circuit; and
the first controller configured to detect the number of the coupled wireless power receiving terminals according to the transmitting power detected during the first time period and the transmitting power detected during the second time period.

3. The wireless power transmission system of claim 1, wherein the wireless power transmitting terminal is configured to calculate the number of the wireless power receiving terminals by dividing a difference between the transmitting power detected during the second time period and the transmitting power detected during the first time period by specific power of the detection load.

4. The wireless power transmission system of claim 1, wherein the wireless power receiving terminal comprises:
a power receiving circuit configured to receive power;
a detection load and a detection switch connected in series at an output port of the power receiving circuit;
a control switch provided between the output port of the power receiving circuit and an output port of the wireless power receiving terminal; and
the second controller is configured to control the detection switch and the control switch to maintain off during the first time period and control the detection switch to turn on and the control switch to maintain off during the second time period.

5. The wireless power transmission system of claim 1, wherein the second controller is configured to control the detection switch to turn off and the control switch to turn on during a third time period, and
the first controller is configured to detect whether the wireless power receiving terminals are connected to actual loads and supply power to the actual loads according to the transmitting power of the wireless transmitting terminal detected during the first time period and the transmitting power of the wireless transmitting terminal detected during the third time period.

6. The wireless power transmission system of claim 1, wherein the wireless power receiving terminal is configured to perform fault detection during a fourth time period.

7. The wireless power transmission system of claim 1, wherein the first controller is configured to control the power transmitting circuit to operate intermittently, and the second controller performs timing according to a power-on time of the power receiving circuit to synchronize with the wireless power transmitting terminal.

8. The wireless power transmission system of claim 2, wherein the first controller is configured to detect whether there is foreign matter according to the transmitting power detected during the first time period.

9. A wireless power transmitting terminal comprising:
a power transmitting circuit;
a power detection circuit configure to detect power input to the power transmitting circuit; and
a first controller configured to detect the number of coupled wireless power receiving terminals according to transmitting power detected during a first time period and transmitting power detected during a second time period.

10. The wireless power transmitting terminal of claim 9, wherein the first controller is configured to detect whether there is a foreign matter invasion according to the transmitting power detected during the first time period.

11. The wireless power transmitting terminal of claim 9, wherein the first controller is configured to calculate the number of the wireless power receiving terminals by dividing a difference between the transmitting power detected during the second time period and the transmitting power detected during the first time period by specific power of a detection load.

12. The wireless power transmitting terminal of claim 9, wherein the first controller is configured to control the power transmitting circuit to operate intermittently.

13. A wireless power receiving terminal comprising:
a power receiving circuit configured to receive power;
a detection load and a detection switch connected in series at an output port of the power receiving circuit;
a control switch provided between the output port of the power receiving circuit and an output port of the wireless power receiving terminal; and
a second controller configured to control the detection switch and the control switch to maintain off during a first time period and control the detection switch to turn on and the control switch to maintain off during a second time period.

14. The wireless power receiving terminal of claim 13, wherein the second controller is configured to control the detection switch to turn off and the control switch to turn on during a third time period.

15. The wireless power receiving terminal of claim 13, wherein the second controller is configured to control the wireless power receiving terminal to perform fault detection during a fourth time period.

16. The wireless power receiving terminal of claim 13, wherein the second controller is configured to performs timing according to a power-on time of the power receiving circuit to maintain synchronization with the wireless power transmitting terminal.

* * * * *